United States Patent [19]

Hines

[11] Patent Number: 4,949,544
[45] Date of Patent: Aug. 21, 1990

[54] SERIES INTERCOOLER

[75] Inventor: William R. Hines, Cincinnati, Ohio

[73] Assignee: General Electric Company, Cincinnati, Ohio

[21] Appl. No.: 280,403

[22] Filed: Dec. 6, 1988

[51] Int. Cl.$^5$ ............................................. F02K 11/00
[52] U.S. Cl. ......................................... 60/728; 60/736
[58] Field of Search ............... 60/728, 736, 39.511, 60/39.53, 39.59; 415/179

[56] References Cited

U.S. PATENT DOCUMENTS

| | | | |
|---|---|---|---|
| 2,407,165 | 9/1946 | Kreitner et al. | 60/41 |
| 2,413,225 | 12/1946 | Griffith | 60/728 |
| 2,584,232 | 2/1952 | Sedille | 60/728 |
| 4,244,191 | 1/1981 | Hendriks | 60/728 |
| 4,362,462 | 12/1982 | Blotenberg | 415/179 |
| 4,592,204 | 6/1986 | Rice | 60/728 |
| 4,660,632 | 4/1987 | Yampolsky et al. | 165/160 |

FOREIGN PATENT DOCUMENTS

| | | | |
|---|---|---|---|
| 53-68308 | 6/1978 | Japan | 60/728 |
| 55-32930 | 7/1980 | Japan | 60/728 |
| 2072268 | 9/1981 | United Kingdom | 60/728 |

OTHER PUBLICATIONS

Roth, G. L. and Williamson, O. L., "How to Use Fuel as a Heat Sink," *Space-Aeronautics*, pp. 56-60, Mar. 1960.

Primary Examiner—Donald E. Stout
Assistant Examiner—Timothy S. Thorpe
Attorney, Agent, or Firm—Harley R. Ball; Jerome C. Squillaro

[57] ABSTRACT

A gas turbine engine having a series intercooler positioned between a first and a second compressor. The intercooler has a first fuel heating system which has a heated fuel outlet and the heated fuel outlet is coupled to a combuston region of the engine. The intercooler also has a second feedwater intercooler stage which heats feedwater and the heated feedwater is input into a turbine exhaust heat exchanger. At least one turbine is positioned downstream of the combustor region and the turbine exhaust heat exchanger is downstream of the turbine. The intercooler may also include the first fuel heating system having the heated fuel outlet coupled to the combustor region and a second intercooler stage having a water input port.

29 Claims, 2 Drawing Sheets

SERIES INTERCOOLER

The invention relates to an intercooler and, more particularly, to an intercooler for use within compressor units of an engine such as a gas turbine engine.

BACKGROUND OF THE INVENTION

Gas turbine engines typically comprise a compressor which compresses a working fluid, such as air. The compressed air is injected into a combustor which heats the fluid causing it to expand and the expanded fluid is forced through a turbine. The compressor typically consists of a low pressure compressor unit and a high pressure compressor unit with an intercooler positioned therebetween. The intercooler extracts heat from the air compressed in the low pressure compressor thereby reducing both the temperature and volume of air entering the high pressure compressor. The use of an intercooler within the compressor units of an engine always reduces thermal efficiency but increases power output significantly. The power output is typically increased by 25 to 30 percent (%) or more by increasing the mass flow of the core engine. Typically, the intercooler removes heat by circulating cool water through the intercooler which becomes heated. The heated water is then removed overboard such as by using a water cooler which dissipates the heated water as vapor into the environment. However, when the heated water is removed overboard this results in losses in total cycle thermal efficiency. For intercoolers employed in an aircraft derivative gas turbine engine configuration, up to 7% equivalent energy of the available fuel energy being used can be lost from intercoolers. Further, single stage intercoolers which use a water cooler may also not sufficiently reduce the temperature of the air to achieve maximum output. Additionally, the water cooler may be a cooling tower which results in added system costs to avoid environmental problems. In other engine configurations, such as a steam injected engine, the water which is to serve as the steam source may be circulated through the intercooler such as disclosed by K. O. Johnson in U.S. Pat. No. 4,569,195 entitled "Fluid Injection Gas Turbine Engine And Method For Operating," incorporated herein by reference. This system discloses a single intercooler and therefore the temperature of the air entering the high compressor may not be sufficiently reduced to achieve maximum output.

SUMMARY OF THE INVENTION

An engine comprises a first compressor for producing a downstream flow and an intercooler positioned downstream of the first compressor. The intercooler has a first fuel heating system which has a heated fuel outlet. The intercooler also has a second intercooler stage which has a feedwater input port and a feedwater output port in which the feedwater input port is coupled to a means for supplying water. A second compressor is positioned downstream of the intercooler and a combustor region is positioned downstream of the second compressor. The combustor region is coupled to the fuel outlet and a turbine is positioned downstream of the combustor region. A turbine exhaust heat exchanger is downstream of the turbine and the heat exchanger is coupled to the feedwater output port.

The invention also includes a turbine engine comprising a first compressor for producing a downstream flow and an intercooler positioned downstream of the first compressor. The intercooler has a first fuel heating system having a heated fuel outlet. The intercooler also has an intercooler stage having a water input port. A second compressor is positioned downstream of the intercooler and a combustor region is positioned downstream of the second compressor. The combustor region is coupled to the fuel outlet and a turbine is positioned downstream of the combustor region.

DETAILED DESCRIPTION OF PREFERRED EMBODIMENTS

Figure 1:
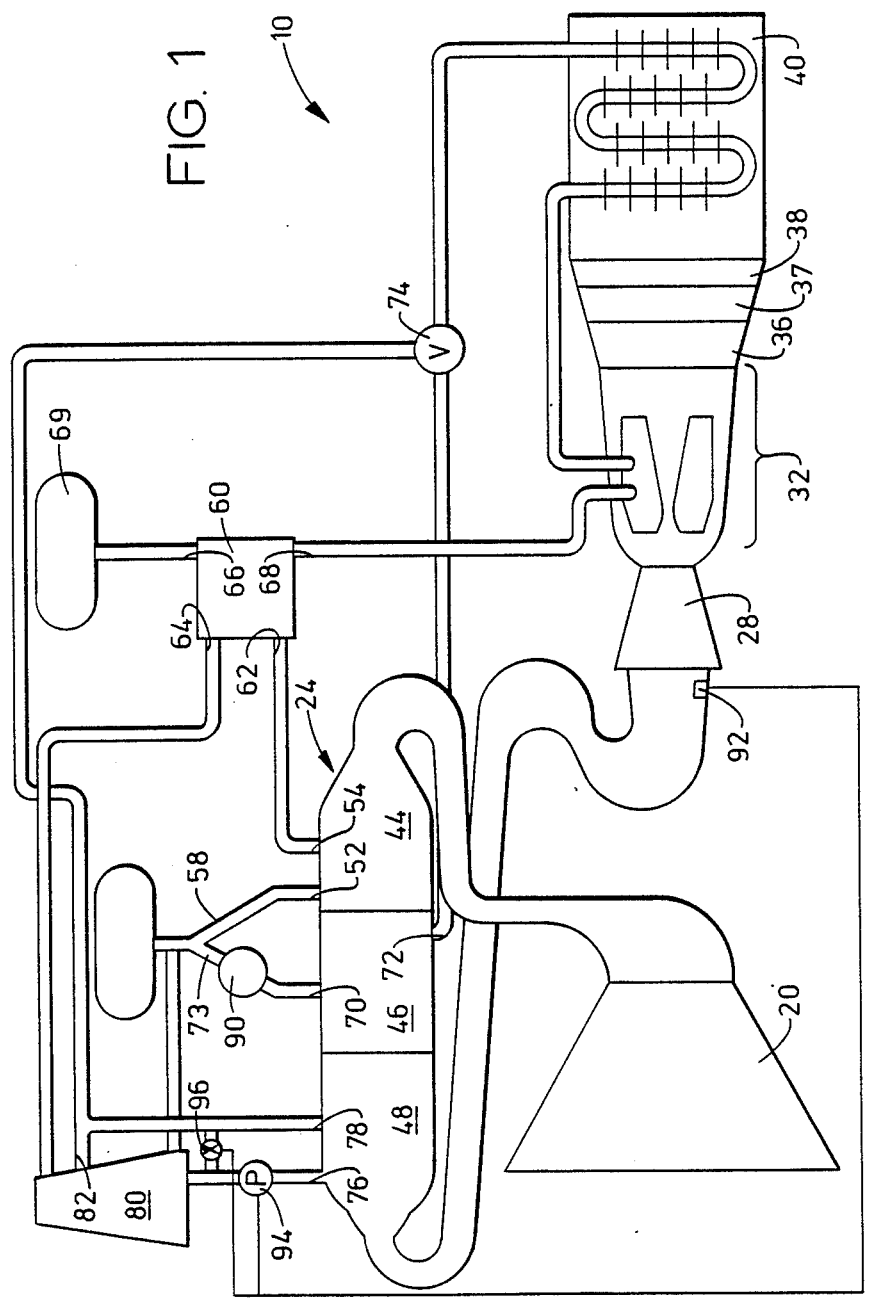
FIG. 1 is a schematic diagram of one embodiment of the invention.

In FIG. 1 a turbine engine 10 comprises a first compressor 20 which produces a downstream flow, an intercooler 24 is positioned downstream of the compressor 20, a second compressor 28 is positioned downstream of the intercooler 24, a combustor region 32 is positioned downstream of the second compressor 28, first, second and third turbines 36, 37, and 38 respectively, are positioned downstream of the combustor region 32, and a turbine exhaust heat exchanger 40 is positioned downstream of the first, second and third turbines 36, 37 and 38 respectively.

The intercooler 24 comprises a first intercooler stage 44, a second intercooler stage 46, and typically a third intercooler stage 48. The first stage 44 typically has first stage input and output ports 52 and 54 respectively. The first stage input port 52 is coupled to a means for supplying water 58 and the output port 54 is coupled to a fuel heater 60 through a water input port 62 of the fuel heater 60. The fuel heater 60 also has a water output port 64 and both a fuel inlet 66 and a fuel outlet 68. The fuel inlet 66 is coupled to a means for supplying fuel 69 and the fuel outlet 68 is coupled to the combustor region 32. The second intercooler stage 46 has a feedwater input port 70 and a feedwater output port 72. The feedwater input port 70 is coupled to a feedwater supply means 73 and the feedwater output port 72 is coupled to the turbine exhaust heat exchanger 40 through a feedwater valve 74. The third intercooler stage 48 has third stage input and output ports 76 and 78 respectively. The third stage input port 76 is typically coupled to a water cooler 80 for supplying cool water and the third stage output port 78 is connected to a hot water input 82 of the water cooler 80. Typically, the hot water input 82 is coupled to the feedwater valve 74 and the water cooler 80 is also coupled to the means for supplying water 58. The third intercooler stage 48 preferably comprises a variable effectivity heat exchanger such that the amount of cooling can be controlled. Preferably at least one sensor 92 is positioned between the intercooler 24 and the second compressor 28 and is typically positioned prior to or at the interfacing of the second compressor 28. The sensor 92 is coupled to devices which can alter the effectivity of the third intercooler stage 48 such as water pumps 94 which can change the water flow. Alternatively, the sensor 92 may be coupled to a valve 96 which may redirect at least a portion of the heated water to bypass the water cooler 80 to increase water temperature entering the third intercooler stage 48 through the third stage input port 76 thereby raising the air temperature at the inlet of the second compressor 28.

The first compressor 20, second compressor 28, combustor region 32, and first, second and third turbines 36, 37 and 38 respectively, are typically formed by standard techniques well known in the art and preferably are those used in a gas turbine engine of an aircraft engine derivative type. The first compressor 20 may be either an axial or a centrifugal type compressor formed such that the compressed air may be diverted to the intercooler 24. The first turbine 36 is typically connected to the second compressor 28, the second turbine 37 is typically connected to the first compressor 20 and the third turbine 38 is typically a power turbine which is connected to an offtake shaft for power generation. The first and second intercooler stages, 44 and 46 respectively, are preferably air to water heat exchangers with both the first and second intercooler stages preferably designed for maximum effectiveness ($\epsilon$) wherein c is defined as:

$$\epsilon = \frac{t_{28} - t_{20}}{t_{28} - t_{52,70,76}}$$

wherein $t_{28}$ is the inlet water temperature in degrees Rankine (°R.), $t_{20}$ is the air exit temperature in °R. and $t_{52,70,76}$ is the inlet water temperature in °R. The maximum effectiveness of the intercooler 24 is typically limited by cost and size limitations, and the effectiveness is generally between about 0.65 and 0.94, and is typically about 0.90. The first intercooler stage 44 is typically sized to heat the total engine fuel flow(s) to as hot as allowable without coking or requiring excessively large fuel nozzles. The second intercooler stage 46 is sized to heat the total feedwater as hot as possible but also to practically size the turbine exhaust heat exchanger 40 such as boilers to reduce the exhaust stack temperature as low as practical within cost and volume limitations.

Preferably, a decelerator is positioned between the first compressor 20 and the intercooler 24. The decelerator typically comprises a pipe whose diameter increases toward the intercooler 24 for decreasing the compressed air speed from about 0.5 mach to about 0.1 mach while controlling flow swirl.

The means for supplying water 58 and feedwater supply means 73 are typically piping which in operation is connected to a suitable water source such as a pond or treated water supplies. It should be understood that separate piping may be connected to separate water supplies, or partially combined piping may be connected to the same water supply to provide the means for supplying water 58 and feedwater supply means 73. Depending on water quality, a water purifier 90 may be coupled to the means for supplying water 58 and feedwater supply means 73. Typically the water purifier 90 is at least coupled between the water source and the feedwater input port 70 such that water supplied by the second intercooler stage 46 to the turbine exhaust heat exchanger 40 is of sufficient quality to provide adequate heat dissipation without providing undesirable residue in the turbine exhaust heat exchanger 40.

Typically, the fuel heater 60 is a water to fuel heat exchanger with maximum effectivity. It should be understood that the first intercooler stage could also be a direct air to fuel heat exchanger. However, based on safety considerations, fuel is typically not directly circulated through the intercooler 24 so as to avoid fuel leaking into the second compressor 28.

The third intercooler stage 48 preferably comprises a variable effectivity heat exchanger. The heat exchanger is formed by standard techniques and variable effectivity is provided by controlling the amount of water or the temperature of the water passing through the heat exchanger.

It should be understood that the first second and third intercooler stages, 44, 46 and 48 respectively may be in any order downstream of the compressor 20. For example, the second intercooler stage 46 may be adjacent the first compressor 20. However, to obtain maximum efficiency it is preferably desirable to have the first intercooler stage 44 for fuel heating adjacent the first compressor 20 such that the fuel obtains maximum heat absorption.

The sensor 92 may be any suitable sensor such as a humidity sensor and a temperature sensor such as disclosed by Paul H. Kydd et al. in U.S. Pat. No. 3,639,347 entitled "Steam Injection In Gas Turbines Having Fixed Geometry Components" incorporated herein by reference.

The water cooler 80 may be any type of water cooling means, such as a cooling tower or cooling pond.

The turbine exhaust heat exchanger 40 may be any type of heat exchanger which heats water. Typically, the turbine exhaust heat exchanger 40 is a boiler or series of boilers. Alternatively, other systems employing a heat exchanger such as a chemical recuperator in which the water is fed to reformers may be used. In the case of a boiler or boilers as depicted in FIG. 1, the output of the boilers is coupled to the turbine engine such as to the combustor region 32 or to the fronts of all of the turbines.

In operation, air is compressed by the first compressor 20, and as a result of this compression the air is heated. The heated air is then passed through the intercooler 24 in which the temperature of the air is decreased. While the heated compressed air is passing through the intercooler 24, the first intercooler stage 44 receives water from the means for supplying water 58 through the first stage input port 52. The water is heated by circulating through the first intercooler stage 44 and then exits through the first stage output port 54. The heated water then passes into the water input port 62 of the fuel heater 60 and circulates through the fuel heater 60 exiting through the water output port 64. Simultaneously, fuel is received from the means for supplying fuel 69 through the fuel inlet 66 and circulates through the fuel heater 60. The transfer of heat from the circulating water to the fuel, heats the fuel and then the heated fuel exits through the fuel outlet 68 and enters the combustor region 32. The cooled but hot water exiting the fuel heater 60 is returned to either the cooling tower, is dumped, or may be injected as a spray into the third stage if it is an evaporator stage.

Water from the feedwater supply means 73 also enters the second intercooler stage 46 to serve as feedwater for the turbine exhaust heat exchanger 40. This water enters the feedwater input port 70 circulates through the second intercooler stage 46 and then exits through the feedwater output port 72. The heated feedwater then flows into the turbine exhaust heat exchanger 40. Alternatively, in the absence of a heat exchanger 40, or when the heat exchanger 40 is off line such as for maintenance, the feedwater may be redirected away from the heat exchanger 40 by the feedwater valve 74 into the hot water input port 82 of the water cooler 80. Preferably, if the turbine exhaust heat exchanger 40 is a boiler, then the boiler provides superheated steam for injection into the engine as described in my U.S. Pat. No. 4,631,914 entitled "Gas Turbine Engine of Improved Thermal Efficiency," incorporated herein by reference. Typically, about 90 percent (%) of heat may be removed by the first and second stages, 44 and 46 respectively. The third stage 48 provides for further cooling by receiving water at input port 76 such that the water exits through the third stage output port 78. This intercooler 24 enhances steam injected power engine performance both in specific power and thermal efficiency. Efficiency is increased by recuperating heat energy by heating the fuel and heating feedwater to the turbine exhaust heat exchanger 40. Specific power is increased by using the multiple stage intercooler 24 to finally cool the airflow to its lowest allowable temperature. The second intercooler stage 46 which serves as the feedwater heater actually transfers the heat from the intercooler to the exhaust stack where it can be recuperated. It is practical to reduce exhaust stack temperature to as low as 265° F., The intercooler also reduces the resultant cooling flow temperature and greatly reduces core rotor speed. These effects therefore allow for increasing of the gas turbine engine firing temperature.

The sensor 92 provides for a variable effectivity heat exchanger by controlling the amount of water flow or the temperature of the water which circulates through the third intercooler stage 48. When increased humidity levels are detected by the sensor 92, the sensor provides a signal, such as an analog signal corresponding to the humidity level. This signal then provides a signal to the pump 94 which decreases the flow through the third intercooler stage 48 thereby resulting in less cooling and increased temperature of the air exiting the intercooler 24 which reduces the relative humidity at the air input of the second compressor 28. Alternatively, the sensor is coupled to a valve 96 which bypasses a portion of the heated water around the water cooler 80 into the third stage input port 76 thereby increasing the temperature of the water circulating in the third intercooler stage 48. The variable effectivity heat exchanger, when coupled to the humidity sensor 92, provides the ability to control the relative humidity of the air entering the second compressor 28 so as to avoid condensation. Typically, the humidity is controlled to be between about 85% and 95% and preferably is about 90%. The ability to control relative humidity allows one to minimize or eliminate condensation in the engine which could lead to blade erosion if the size of the condensed water droplets are too large.

Figure 2:
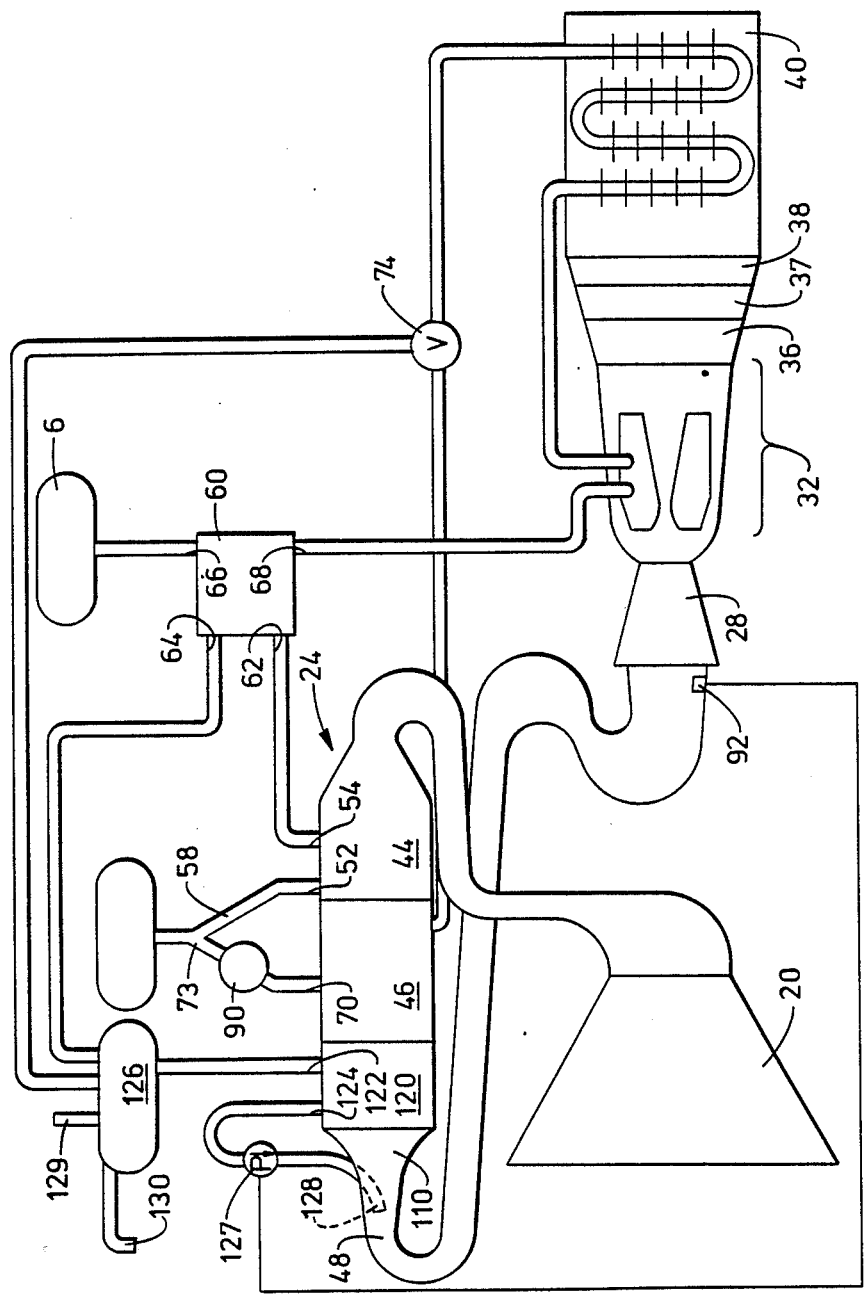
FIG. 2 is a schematic diagram of another embodiment of the invention.

As shown in FIG. 2, wherein like numerals correspond to like elements of FIG. 1, the third intercooler stage 48 may incorporate an evaporative cooler. Preferably, the third intercooler stage 48 only consists of an evaporative cooler which is coupled to and is adjacent to the second compressor 28 such that substantially no waste heat is lost overboard by the system therefore minimizing energy losses which are directly expelled into the environment by a water cooler or dump line. Preferably an accelerator 110 is positioned prior to the position at which water is injected into the evaporative cooler. The accelerator 110 typically comprises a pipe having a gradually decreasing diameter for increasing air speed from about 0.1 Mach number to about 0.5 Mach number. It is typically desirable to provide an evaporative cooler water stage 120 prior to the third intercooler stage 48. The evaporative cooler water stage 120 has evaporative stage input and output ports 122 and 124 respectively. The evaporative stage input 122 is preferably coupled to an evaporator water supply 126 and the evaporative stage output 124 is coupled to a high pressure pump 127 which is coupled to a water spray injector 128 in the evaporative cooler. The evaporator water supply 126 is preferably coupled to the water output port 64 of the fuel heater 60 and the feedwater valve 74. The evaporator water supply 126 is also preferably coupled to a water source 129 and a water dump line 130. The sensor 92 is coupled to the high pressure pump 127.

The operation of the embodiment of FIG. 2, is similar to that of FIG. 1. However, when compressed air passes through the first and second intercooler stages 44 and 46 respectively, and enters the third intercooler stage 48, rather than the water cooler 80 providing the cooling, water is injected into the system at high pressure up to about 2000 pounds per square inch absolute (PSIA) to form a fine mist and then evaporates and thereby provides the additional system cooling. The water which is injected is preferably heated by using a portion of the water which circulates through the fuel heater 60 or alternatively, the evaporator may use feedwater from feedwater valve 74 particularly when the turbine exhaust heat exchanger 40 is being bypassed. This water exits the fuel heater 60 through the water output port 64 and passes into the evaporator water supply 126. Additional water is obtained through the water source 129 and any excess water is dumped through the water dump line 130 which may be coupled to a water cooler. The water supplied by the evaporator water supply 126 then passes through the evaporative stage input port 122 and the water is heated by circulating in the evaporative cooler water stage 120 and exits through the evaporative stage output 124. The water then passes through the high pressure pump 127 and exits into the intercooler 24 through the water spray injector 128. The amount of water which is injected through the high pressure pump 127 into the engine is controlled by the sensor 92 which detects the humidity and sends a corresponding signal to the high pressure pump 127. This system, unlike an all evaporative cooling system, by using non-evaporative cooling stages minimizes water vapor in the cycle and therefore the amount of vapor ultimately lost through the engine cycle out the exhaust stack is also minimized. Further, since the evaporative cooler is preferably positioned prior to and adjacent the second compressor 28 the air may be accelerated for flow into the second compressor 28 and this air flow acceleration also enhances evaporation capability. Additionally, by heating the evaporative cooler water through the evaporative cooler water stage 120, the water which is injected by the evaporative cooler may be heated so as to further enhance evaporation.

Depending on the ambient relative humidity, some of the water exiting the fuel heater may have to be dumped overboard into a cooling pond. This amount for boilers on-line could be 0 to 2 lb/sec of water (approximately 2 gallons per minute GPM) at about 90° F. for ambient 60% relative humidity. For lower ambient humidity no water may have to be dumped overboard.

I claim:
1. A turbine engine comprising:
a first compressor for producing a downstream flow;
an intercooler positioned downstream of said first compressor, said intercooler having a first fuel heating system having a heated fuel outlet, a second intercooler stage having a feedwater input port and a feedwater output port, said feedwater input port being coupled to a means for supplying water;

a second compressor positioned downstream of said intercooler;

a combustor region positioned downstream of said second compressor, said combustor region being coupled to said fuel outlet;

a turbine positioned downstream of said combustor region; and a turbine exhaust heat exchanger downstream of said turbine, said heat exchanger being coupled to said feedwater output port.

2. The engine of claim 1 wherein said fuel heating system comprises a first intercooler stage having first stage input and output ports, said input port being coupled to a means for supplying water and said output port is coupled to a fuel heater, said fuel heater having a fuel inlet and said fuel outlet, said fuel inlet is coupled to a means for supplying fuel.

3. The engine of claim 2, wherein said first intercooler stage is adjacent said first compressor.

4. The engine of claim 1, wherein said turbine exhaust heat exchanger is a boiler and said boiler has a steam output which is coupled to said engine.

5. The engine of claim 1, further comprising a third intercooler stage.

6. The engine of claim 5, wherein said third intercooler stage is a variable effectivity heat exchanger.

7. The engine of claim 6, further comprising a third intercooler stage having third stage input and output ports which are coupled to a water cooler.

8. The engine of claim 6, wherein said third intercooler stage is coupled to a humidity sensor which controls the effectivity of said third intercooler stage.

9. The engine of claim 8, wherein said humidity sensor is positioned between the intercooler and the second compressor.

10. The engine of claim 8, wherein said third intercooler stage is coupled to at least one pump for controlling water flow and said pump is coupled to said humidity sensor.

11. The engine of claim 8, further comprising a third intercooler stage having third stage input and output ports which are coupled to a water cooler wherein said third intercooler stage is coupled to at least one valve for redirecting a portion of water to bypass said water cooler and said valve is coupled to said humidity sensor.

12. The engine of claim 5, wherein said third intercooler stage is an evaporative cooler.

13. The engine of claim 12, wherein said intercooler further comprises an evaporative cooler water stage having evaporative stage input and output ports wherein the evaporative stage output is coupled to said input port of said evaporative cooler.

14. The engine of claim 12, wherein an accelerator is positioned prior to said evaporative cooler.

15. The engine of claim 12, wherein said evaporative cooler is coupled to a humidity sensor for controlling the amount of water injected into said evaporative cooler.

16. A turbine engine comprising:
a first compressor for producing a downstream flow;

an intercooler positioned downstream of said first compressor, said intercooler having a first fuel heating system having a heated fuel outlet, and also having a second intercooler stage having a water input port;

a second compressor positioned downstream of said intercooler;

a combustor region positioned downstream of said second compressor, said combustor region being coupled to said fuel outlet; and a turbine positioned downstream of said combustor region.

17. The engine of claim 16 wherein said fuel heating system comprises a first intercooler stage having first stage input and output ports, said input port being coupled to a means for supplying water and said output port is coupled to a fuel heater, said fuel heater having a fuel inlet and said fuel outlet, said fuel inlet is coupled to a means for supplying fuel.

18. The engine of claim 17, wherein said first intercooler stage is adjacent said first compressor.

19. The engine of claim 16, wherein said second intercooler stage is a variable effectivity heat exchanger.

20. The engine of claim 19, wherein said second intercooler stage also has an output port and said input and output ports are coupled to a water cooler.

21. The engine of claim 19, wherein said second intercooler stage is coupled to a humidity sensor which controls the effectivity.

22. The engine of claim 21, wherein said humidity sensor is positioned between the intercooler and the second compressor.

23. The engine of claim 21, wherein said second intercooler stage is coupled to at least one pump for controlling water flow and said pump is coupled to said humidity sensor.

24. The engine of claim 21, wherein said second intercooler stage is coupled to at least one valve for redirecting a portion of water to bypass said water cooler and said valve is coupled to said humidity sensor.

25. The engine of claim 16, wherein said second intercooler stage is an evaporative cooler.

26. The engine of claim 25, wherein said intercooler further comprises an evaporative cooler water stage having evaporative stage input and output ports wherein the evaporative stage output is coupled to said input port of said evaporative cooler.

27. The engine of claim 25, wherein an accelerator is positioned prior to said evaporative cooler.

28. The engine of claim 25, wherein said evaporative cooler is coupled to a humidity sensor for controlling the amount of water injected into said evaporative cooler.

29. The engine of claim 16, wherein said intercooler further comprises a feedwater intercooler third stage having feedwater input and output ports and said feedwater output port is coupled to a turbine exhaust heat exchanger.

* * * * *